Nov. 7, 1933. A. MONTAN 1,933,636
RAKE
Filed Sept. 22, 1931 2 Sheets-Sheet 2

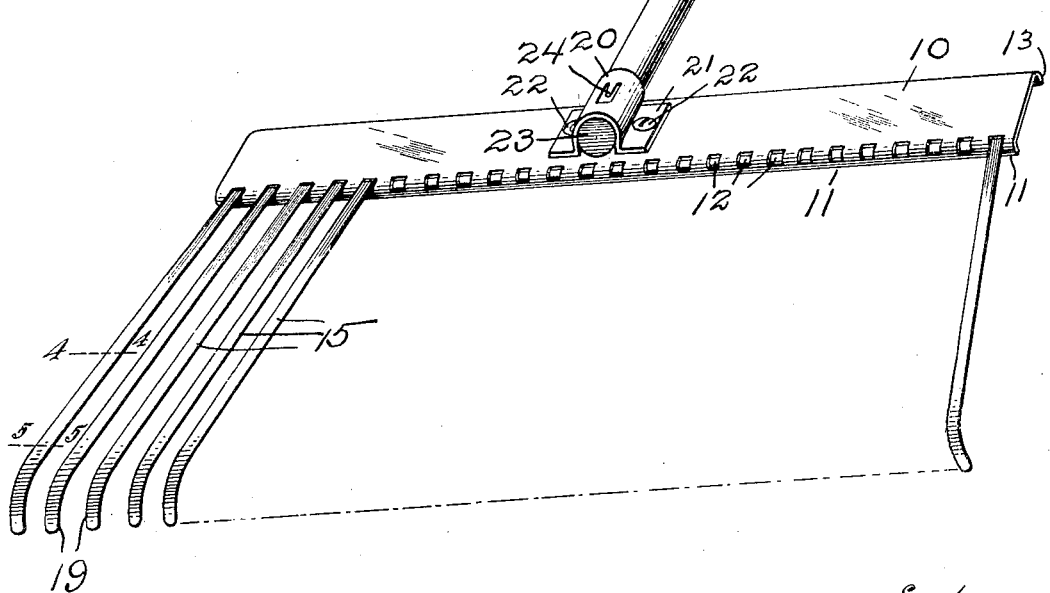
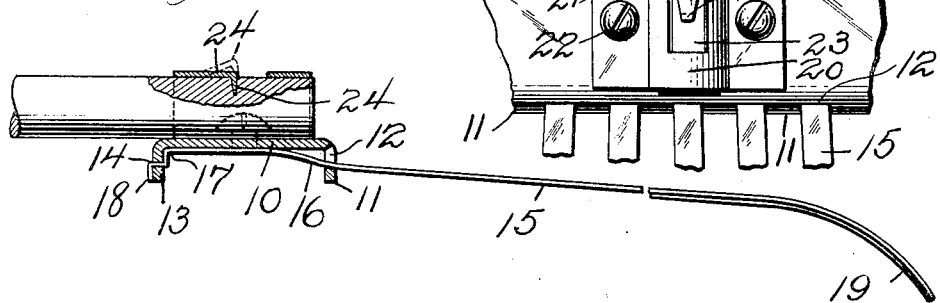

INVENTOR
Adolf Montan,
BY
Wm H. Caufield.
ATTORNEY.

Patented Nov. 7, 1933

1,933,636

UNITED STATES PATENT OFFICE 1,933,636

RAKE

Adolf Montan, Montclair, N. J., assignor to Eastern Tool & Mfg. Co., Bloomfield, N. J.

Application September 22, 1931
Serial No. 564,273

1 Claim. (Cl. 55—114)

This invention relates to an improved rake which is made at low cost, is light in weight and compact in its construction.

The rake has spring metal tines formed to localize the resiliency in rear of the curved front end of the tines which forms the teeth. The invention comprises, also, a construction which causes a cooperation between the bar and the tines to hold the tines in place without additional holding means.

The rake has a further advantage in that the straight bar is perforated to receive the tines and the perforations are so placed as to form a fan-like group of tines when the rake is assembled.

Figures 6, 7:
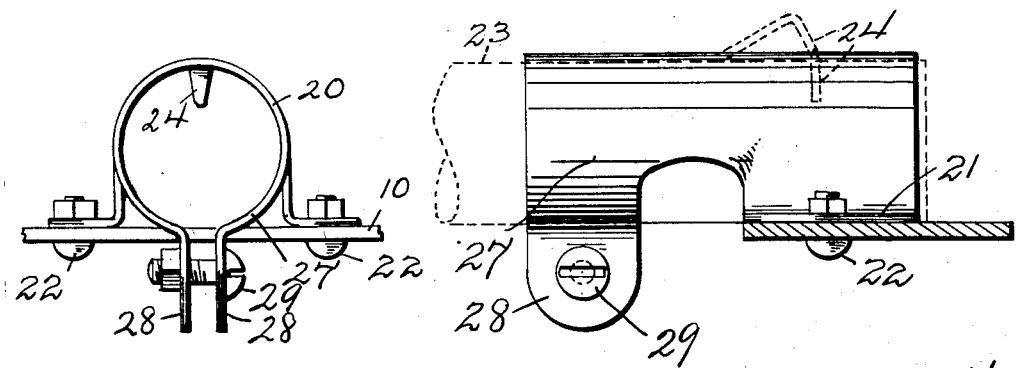
Figures 8, 9:
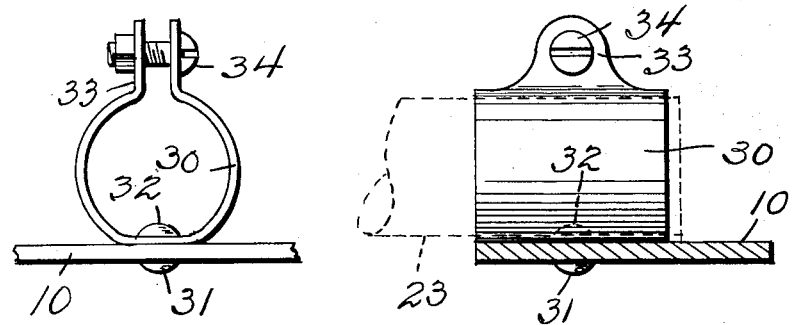
Figure 10:
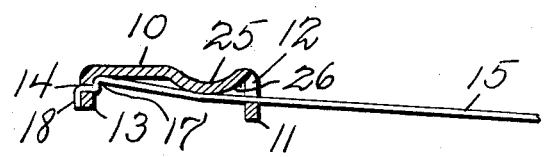

The invention is illustrated in the accompanying drawings in which Figure 1 is a perspective view of a rake embodying my invention with some tines removed. Figure 2 is a cross section on Figure 1 and showing the handle broken away. Figure 3 is a top view of part of the rake showing the clip for holding the handle in place. Figure 4 is a section on an enlarged scale on line 4—4 in Figure 1. Figure 5 is a similar view on line 5—5 in Figure 1. Figure 6 is an end view and Figure 7 is a side view of a modified form of clamp on the rake for the reception of a handle. Figure 8 is an end view and Figure 9 is a side view of another modification of clamping means. Figure 10 is a detail section of the rake, this being of modified form and showing an elevation of a tine in place therein.

The rake comprises a bar 10 which is of stout sheet metal and with a flange 11 on its front edge. The flange 11 is provided with perforations 12 spaced apart along its length. On the rear edge of the bar is a flange 13 with perforations 14 spaced apart but closer together than the perforations 12. The perforations 12 have their top edges at the bottom face of the bar 10 and extend for a greater distance down the face of the flange 11 than the thickness of the tine.

The tines 15 are of flat spring metal and extend through the perforations 12 and through the perforations 14 in the flanges 11 and 13 respectively. The tines have humped or curved portions at 16 which allow play between the tines and the upper edges of perforations 12. This prevents a sharp bend in the tine under pressure and thus prevents breakage. The tines have shoulders 17 which fit in the juncture of the bar 10 and the flange 13. The ends of the tines are bent down on the outside face of the flange 13 as at 18. The tines are flat except at the curved portions or teeth 19. This is clearly seen from Figures 4 and 5. This stiffens the teeth 19 and makes that part of the tine between the tooth 19 and the bar the most resilient. This localizing of the resiliency keeps the teeth from becoming straight but does not stiffen the tine proper. The rake thus does no damage to grass or its roots when used on a lawn.

In Figure 10, I show a modification in which the bar 10 is ribbed or channelled as at 25 which illustrates another way to cause a spring tension on the tine to hold it in place and at the same time provide an inclined face 26 on which the tine presses when flexed and eliminates sharp corners that might be engaged by the tine to break it.

The upper face of the bar 10 is provided with a clip 20 of rounded form and with flat ends 21 which are secured by screws 22 to the bar 10. The handle has its end 23 placed in the clip and it is thus held against the bar 10. The clip has a prong 24 bent up as shown in dotted lines in Figure 2. When the handle is in place the prong 24 is forced into the handle and the handle is held in this way against withdrawal or rotation relative to the bar 10.

A modified form of clamp is shown in Figures 6 and 7. The clamp is extended beyond the bar 10 to form a round part 27 with ears 28 forced toward each other by the screw 29. This form provides for holding the handle against longitudinal movement by the prong 24 and against looseness or side movement due to shrinking the loop or ring 27.

In Figures 8 and 9, I show a single loop 30 fastened to the bar 10 by a rivet or rivets 31 with a head 32 on the inside on the loop. The ears 33 are forced inwardly by the screw 34. When the handle is clamped by the loop 30, being compressed by screw 34, the wooden handle is forced down and the head 32 is embedded in the handle and holds the handle against withdrawal.

Various changes can be made in the proportion and form of the parts without departing from the scope of the invention.

I claim:—

A rake comprising a straight bar of sheet metal with front and rear flanges at its edges, the flanges having perforations therein, tines of flat spring sheet metal, each tine passing through a front perforation and through a rear perforation with its rear end bent over against the outer face of the rear flange, each tine also having a shoulder seated in the juncture of the rear flange and the bar and having a downwardly extending portion where the tine emerges from the front perforation, said front perforations being of a dimension to allow a considerable movement of the tine therein.

ADOLF MONTAN.